Dec. 15, 1970     E. D. COTTRELL     3,547,742
LAMINATOR APPARATUS
Filed Feb. 23, 1967     3 Sheets-Sheet 1
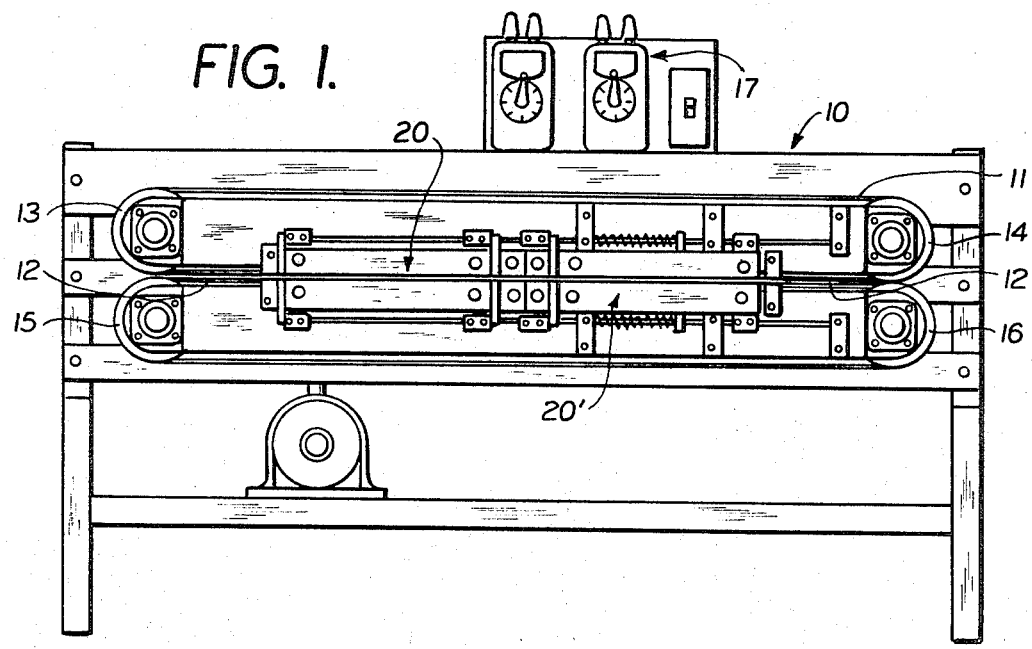
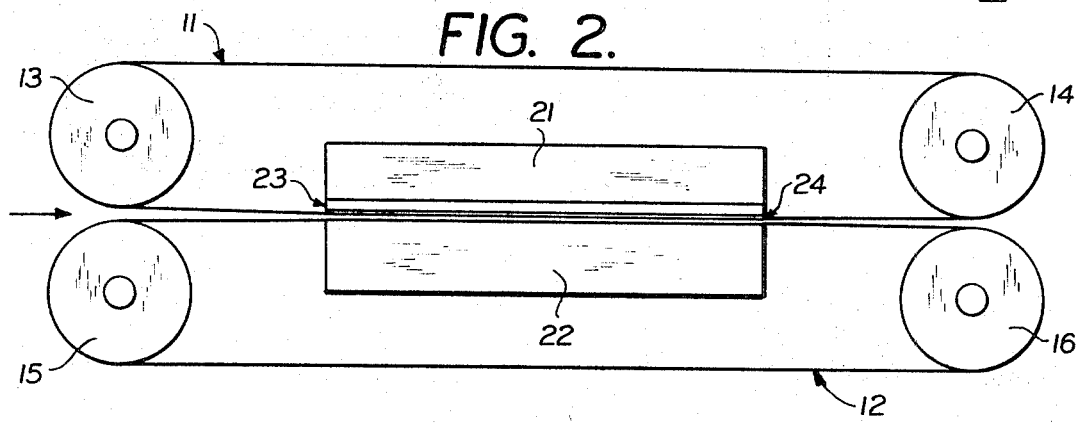
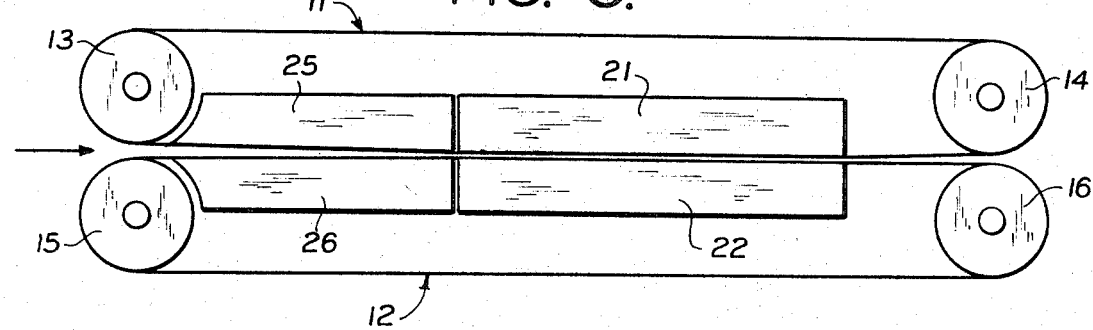
INVENTOR
EDWARD D. COTTRELL
BY
*James M. Heilman*
ATTORNEY.

Dec. 15, 1970   E. D. COTTRELL   3,547,742
LAMINATOR APPARATUS

Filed Feb. 23, 1967   3 Sheets-Sheet 2

INVENTOR
EDWARD D. COTTRELL
BY
James M. Heilman
ATTORNEY.

Dec. 15, 1970 E. D. COTTRELL 3,547,742
LAMINATOR APPARATUS
Filed Feb. 23, 1967 3 Sheets-Sheet 3
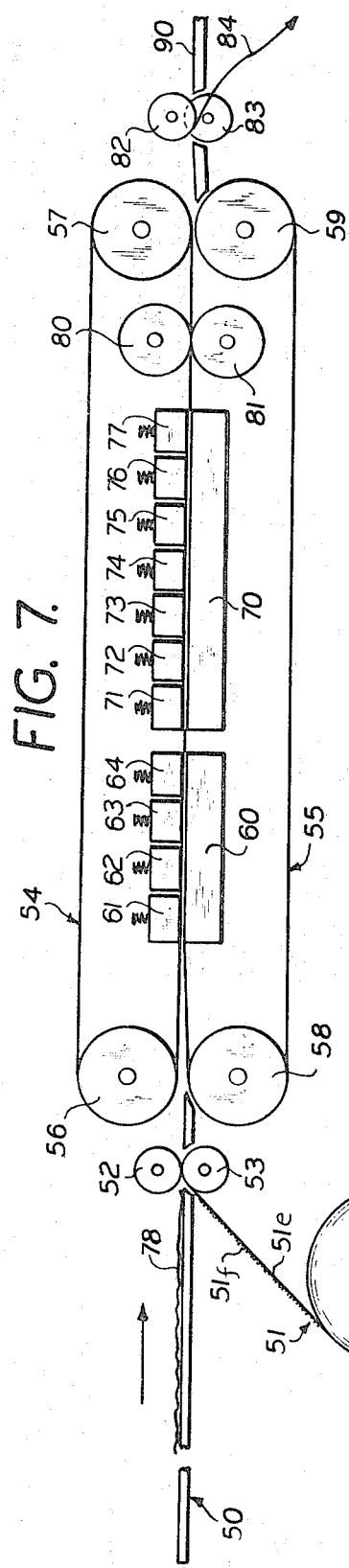
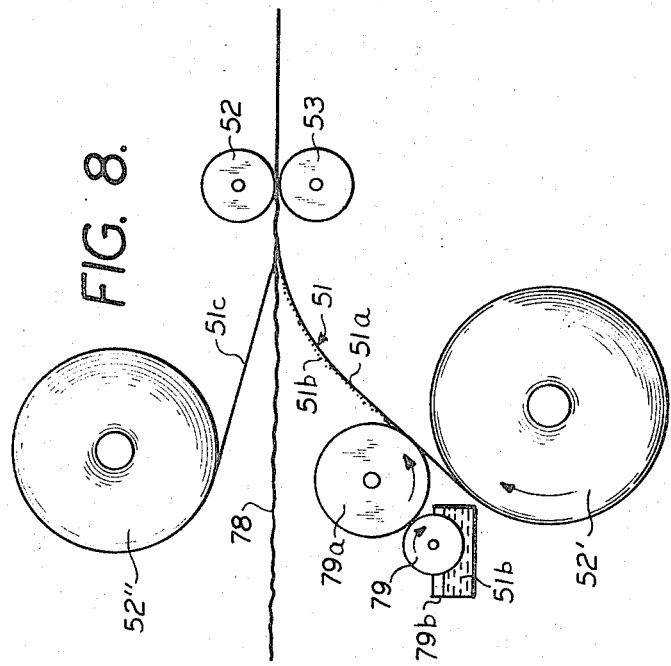
INVENTOR
EDWARD D. COTTRELL
BY James M. Heilman
ATTORNEY.

United States Patent Office 3,547,742
Patented Dec. 15, 1970

3,547,742
LAMINATOR APPARATUS
Edward D. Cottrell, Orangeburg, S.C., assignor to U.S. Plywood-Champion Papers Inc., a corporation of New York
Filed Feb. 23, 1967, Ser. No. 618,208
Int. Cl. B30b 5/04; B32b 31/20
U.S. Cl. 156—583      7 Claims

ABSTRACT OF THE DISCLOSURE

Articles, apparatus and process for laminating a decorative wood veneer or other decorative surface to a backing of paper or metallic foil with or without a protective transparent face.

---

The present invention is concerned with a process and apparatus for effectively laminating a thin veneer of wood to a tape backing. The invention is especially directed to a method and apparatus for the manufacture of sheets of flexible construction material which may be rolled for shipment and storage, which sheets consist of a thin veneer of wood adhered to a suitable fibrous backing, such as fabric, canvas, cloth, fiberglass, paper, all impregnated or unimpregnated, and the like. In accordance with a specific adaptation of the present invention an apparatus is utilized which comprises an upper and lower endless belt between which the wood veneer and tape are conveyed and processed to secure a high quality flexible product. The belts comprise fiber glass fabric impregnated with Teflon (polytetra fluoroethylene, manufactured by Du Pont).

The material is extensively used for wall covering where long lengths of continuous veneers are desired, or for curved surfaces; or for laminated surface veneers in furniture and displays and the edges thereof; in high pressure laminates for table, counter, and cabinet tops, etc. When used with a metallic backing the laminate becomes a scorch-proof or cigarette-proof table top, for example.

It is known in the art to prepare flexible rollable material for use in the construction industry which rolled material comprises a thin veneer of wood adhered to a fabric backing. The thickness of the wood veneer, which may be any type of wood, varies in the range from .008" to .036" as, for example, .012" in thickness. Typical of such material is "Flexwood" and "Wood Trim" (the latter generally formed with a paper backing), both materials manufactured and sold by U.S. Plywood Corporation, the assignee of the present application. The thickness of the fabric backing, which may be of any suitable material, varies in the range of .002" to .020" as for example, .005" in thickness. In general, the manufactured article which is shipped in rolls is in the thickness range of .015" to .025".

This flexible construction material is then utilized at the site by adhering the same to a suitable support, such as a wall. However, with respect to the manufacture of this material, due to the thinness of the same, various problems have been encountered. For example, it has been difficult to secure the adhesion desired between the fibrous backing and the thin wood veneer. Another difficulty is to secure the desired smoothness of the finished product. In accordance with the present invention, these difficulties are overcome and an efficient and rapid method developed for the production of a very high quality product.

The process of the present invention may be readily understood by reference to the figures illustrating embodiments of the same.

FIG. 1 is a front overall view of the present apparatus.

FIGS. 2, 3, 4, 5, 6 and 7 are diagrammatic views of various other adaptations of the platen arrangement of the apparatus and process.

FIG. 8 is similar to FIG. 7 but illustrates an aluminum backed veneer, faced with a protective plastic film.

Figure 4:
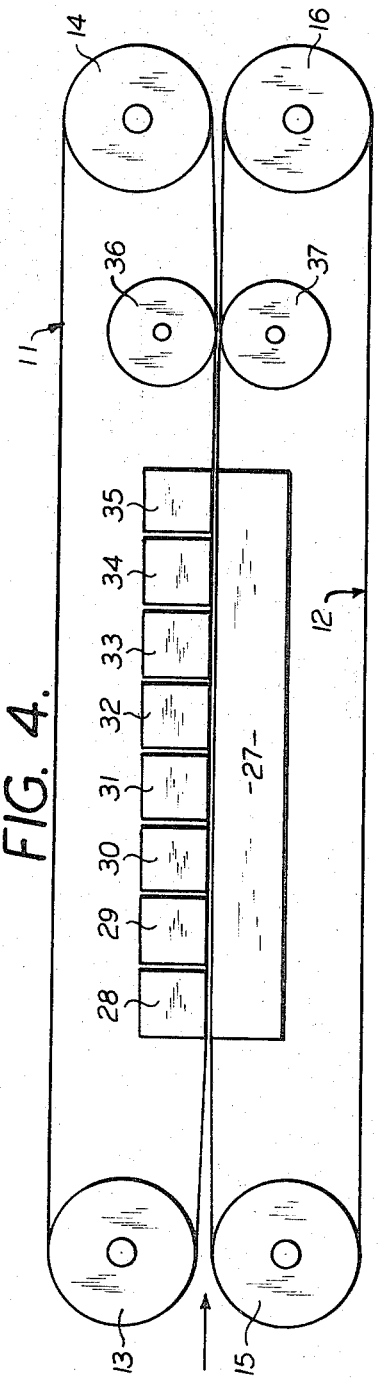

Referring specifically to FIG. 1, a suitable structural frame 10 supports the elements of the apparatus. The essential elements of the apparatus comprise an upper endless belt 11 and a lower endless belt 12. Upper endless belt 11 is supported and moves about rollers 13 and 14, while lower endless belt is supported and moves about rollers 15 and 16. Suitable conventional continuous or interrupted timing and control apparatus 17 is positioned at the top of the structure 10.

The fabric or paper backing and the wood veneer passes between the respective belts 11 and 12. An arrangement of upper platen 20 and lower platen 20' is positioned abutting the top of lower belt 12 and abutting the bottom of upper belt 11. Suitable conventional motor drive means is provided for the respective belts.

A specific adaptation of the present invention is that the belts be constructed of fiber glass fabric and that these belts be impregnated with Teflon. The important features of Teflon as far as use as an element of my apparatus is concerned are:

(1) Temperature stability to 500° F. for continuous operation.
(2) Parting characteristics excellent over wide range of adhesives, finishes, etc.
(3) High tensile strength.
(4) Nearly zero stretch.
(5) Available in multi-ply construction.

By utilizing belts of the above character, the Teflon acts as a parting agent for all commonly used adhesives, paints, plastics, and the like. Furthermore, the belts as described will withstand extremes of temperature both above and below zero, and they can be operated continuously at elevated temperatures as, for example, between 400° and 600° F., such as about 500° F.

As mentioned above, these belts have excellent tensile strengths and very good antifriction properties and substantially zero stretch. The belts vary in thickness from about .005" to .030" and may be secured in any width, as, for example, up to 80" in width. The lengths of the belts may be up to several hundred feet and will be a function of the number of processing steps used in the manufacture of the flexible laminate.

A preferred type of construction for each belt is best described as two-ply; one ply being relatively greater in thickness perhaps .020"–.030", to provide the tensile characteristics desired, while the second ply being relatively thin, perhaps .006"–.010" and of a tight weave, provides the optimum surface for intimate contact with the laminate. This construction also eliminates the problem of a possible defect in the finished laminate as might be caused by the uneven thickness at the splice of a single ply belt.

Referring specifically to FIG. 2, which illustrates a single heated top platen and lower platen, upper endless belt 11 moves about rollers 13 and 14, while lower endless belt 12 moves around rollers 15 and 16; all rollers being driven by conventional power means (not shown). Short rollers, i.e., 2–8" may be supported by one end in a bearing in a single vertical panel or frame, while longer rollers would have to be supported on both ends. Normally, the forward rollers are spaced slightly farther apart than the rear rollers to form a guiding nip area. The veneer and tape are introduced between rollers 13 and 15 and pass between upper platen 21 and lower platen 22. This figure shows a modification wherein only heat with a minimum pressure is introduced into the laminate. The platens may comprise aluminum platens which are drilled for the introduction of heat as, for example, for the introduction of electric cartridge type heaters. Suitable conventional means are provided for controlling the temperature of these platens in the range from about 150° to 500° F. as, for example, about 350° F.

A very desirable modification, as illustrated in FIG. 2 (but which is equally applicable to all the modifications) is to provide a pad 23 to the lower surface of platen 21. This pad comprises silicon rubber which is adhered to platen 21, and may vary in thickness from about 1/16 to 1/4".

A Teflon fiber glass fabric 24 having a thickness in the range from about .003" to .01" as, for example, of about .006" is bonded to the rubber surface. This pad provides a means of achieving uniform pressure on the laminate by compensating for the minor thickness discrepancies in the laminate as well as providing an anti-friction bearing surface for the belt. The upper platen 21 may be placed in a fixed position but is preferably spring or pneumatically loaded in order to secure the desired results. Loading is adjustable to secure proper unit pressure. The respective platens are placed in a position carefully oriented to the path of the belt. This fabric is used as a bearing surface on both padded and unpadded platens.

Referring specifically to FIG. 3, the apparatus is similar to that described with respect to FIGS. 1 and 2 except that lead-in platens 25 and 26 are provided. The distance between the respective platens decreases in the direction of movement and thus there is provided a smoothing-out arrangement or area for laminates composed of buckled or wrinkled material. It is preferred that platens 25 and 26 be heated by suitable means, not shown, in order to reduce the stiffness and increase the flexibility of the wood and the fabric and thus provide more effective smoothing out of these elements.

FIG. 4 illustrates a further desirable adaptation in that the lower platen 27 is a solid unit whereas the upper treating unit comprises a plurality of segmented platens 28 to 35, inclusive. While eight segmented platens are shown, it is to be understood that any number of segmented platens may be used as, for example, from 2 to 10 or more. A preferred adaptation is to spring or pneumatically load the respective segmented platens so as to secure an increasingly higher pressure as the laminated product being processed moves in the direction of flow. For example, the pressure in platen 28 could be about 2 to 5 p.s.i. whereas the pressure in platen 35 is in the range from about 20 to 50 p.s.i.

A further desirable adaptation of the apparatus as illustrated in FIG. 4, is to have each successive platen at a different temperature. For example, in order to provide rapid temperature build-up, the temperature in platen 28 is in the range from about 450° to 500° F.; the temperature in platen 32 is in the range from about 375° to 400° F., while the temperature in platen 35 is in the range from about 300° to 350° F. The temperature in the lower platen 27 is in the range from about 300 to 350° F. In certain special situations, it might be desirable to have the higher temperature along the flow, i.e., increasing toward the end.

A still further adaptation of the apparatus as illustrated in FIG. 4 is the utilization of pressuring nip rolls 36 and 37. These nip rollers may be positioned either inboard or outboard of the belts but are preferably inboard. The segmenting of the top platen at times will be necessary to eliminate the high inertial loading that is imposed on the belts and laminate when the platen area is of sufficient size and width.

Figure 5:
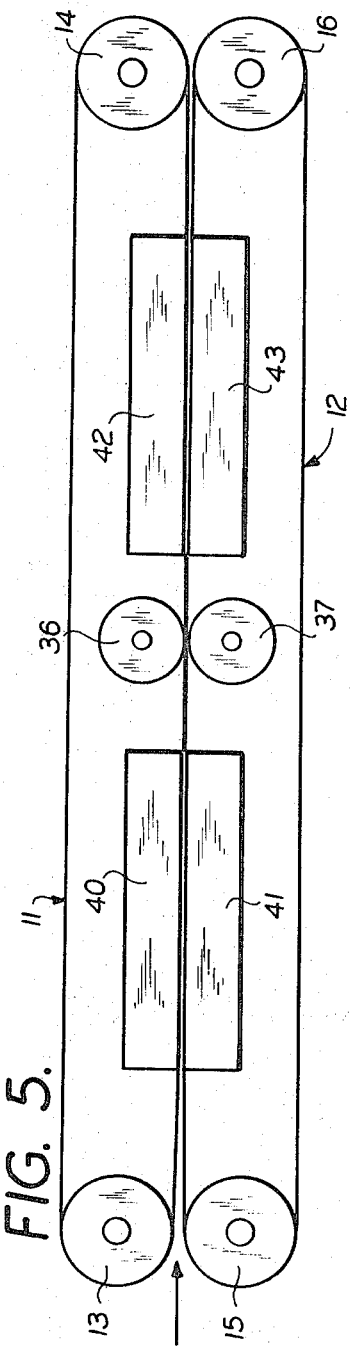

FIG. 5 illustrates an adaptation of FIG. 4 wherein the nip rollers 36 and 37 are positioned between platens 40–41, and 42–43. The advantage of this construction is to provide for rapid temperature build-up.

Figure 6:
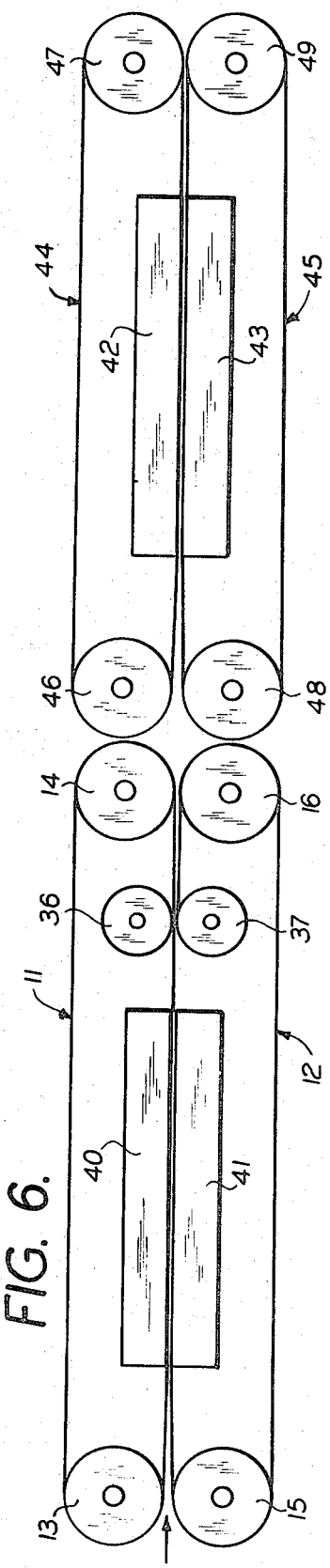

FIG. 6 illustrates an adaptation of the invention as shown in FIG. 5 wherein separate heating and cooling sections are provided which minimizes the heating and cooling requirements since each belt orbit will remain at the proper operating temperatures. Thus, heating platens 40 and 41, having a heating range of 325°–425° F., for example, are supported as illustrated in FIG. 5 except that cooling platens 42 and 43, having a cooling range of 45°–85° F., for example, are positioned abutting belts 44 and 45 which belts are supported by rolls 46 and 47 and rollers 48 and 49 respectively.

FIG. 7 illustrates in some detail the integrated process and apparatus. A lay-up table 50 with a fence set parallel to the travel of the machine provides a place for the operator to orient the wood veneers 78 for introduction into the laminator apparatus.

It is preferable that all pieces will have at least one straight edge produced so that the establishment of the travel line is fixed. A plain or impregnated backing may be used, which backing may be precoated or contemporaneously coated (See FIG. 8) with bonding cement or adhesive. Fir example, adhesive coated 51f paper or fabric 51e is unwound from supply roll 52. One other combination could involve veneer, substrate, and film supported adhesive fed simultaneously from the same roll. The wood veneer 78 and treated tape 51 is passed through feeding nip rolls 52 and 53, and are then passed between upper belt 54 and lower belt 55. Upper belt 54 is supported by rollers 56 and 57. Lower belt 55 is supported by rollers 58 and 59. The length of the respective belts is sufficient to assure complete heating of the laminate and the belts are suitably enclosed in an insulated housing to prevent unnecessary dissipation of heat.

In accordance with this adaptation, the laminates pass between a first lower platen 60 and a plurality of upper platens 61, 62, 63 and 64. It is preferred that suitable heating means be provided with respect to the upper platens so as to secure a temperature in the range from 450°–500° F., preferably about 475° F. in order to provide a rapid buildup of temperature in the laminate. The laminate is then passed between a second lower platen 70 and a plurality of upper segmented platens 71–77, inclusive. This second set of platens is maintained at a temperature in the range from about 300–350° F., such as about 325° F., to assure proper saturation. All platens are pressured by suitable mechanical pneumatic means. Also, pressure differential may be used on the upper platens if desired, but the tapered platen entrance generally takes care of the initial flattening of the veneer.

The laminate passes between a final pair of pressure nip rolls 80 and 81 and then passes by trim rollers 82 and 83 wherein the laminate is trimmed as desired. The waste is removed by means of conduit 84 while the finished laminate passes to storage area 90 for further handling as desired.

FIG. 8 is similar to FIG. 7 but with a metal backing, such as a thin aluminum foil 51a, supplied from roll 52' and coated contemporaneously with a liquid adhesive 51b supplied from trough 79b through application rollers 79 and 79a. Obviously, the treated foil 51c may be supplied in roll form with dried adhesive previously applied thereto, and softened and set by the subsequently applied heat and pressure. The foil must be thin and flexible and able to be bent around sharp corners and edges without breaking.

Alternatively, if desired, either with or without the aluminum foil, a heat softening, transparent plastic film of any conventional type 51c, from roll 52" may be applied to protect the decorative veneer 78.

As pointed out heretofore, the invention is concerned with an integrated process and particular types of apparatus for efficiently producing a high quality laminate which is thin and flexible so as to be rolled for shipment and storage. The conveying belts are Teflon-impregnated fiber glass, and are preferably of two-ply construction ranging from .02''–.040'' in thickness. The electric cartridge heaters employed in conjunction with the platens are conventional, but other heating means may be employed, such as a circulating fluid as, for example, hot oil, or gas or oil-fired hot air generators, etc. While a continuous flow of material through the press is contemplated, an intermittent stop-start bonding process may be used if desired.

Various other modifications are readily apparent from the above description and drawings, all within the scope of my invention. While emphasis is placed on wood veneer and an adhesive treated backing material in which the invention will find its greatest usefulness, other equivalent plies are intended, such as, printed wood designs on paper, etc.

The embodiments of the invention in which an exclusive property or privilege is claimed are defined as follows:

1. An apparatus for smoothing out and bonding a thin laminate which comprises at least one decorative surface layer to a backing layer, comprising supporting members, an upper endless belt, a cooperating lower endless belt, and platens adjacent each of said endless belts to exert substantial pressure on said layers to flatten them as they pass between the belts and platens, said supporting members comprising a forward roller and a rear roller for each endless belt, said belts being treated with polytetrafluoroethylene, said platens being heated and at least one platen being formed in sections, means for applying pressure, and means for gradually changing temperature, the heat in the initial platen sections being highest and gradually diminishing toward the exit end, and pressure rollers provided intermediate the supporting rollers, the belt being made of two plies, one ply being in the range of .020–.030'' to provide the necessary strength, and the outside ply being relatively thin in the range of .006–.010'' and of a tight weave to provide optimum smoothness at the splice for intimate contact with the laminated.

2. An apparatus for smoothing out and bonding a thin laminate which comprises at least one decorative surface layer to a backing layer, comprising supporting members, an upper endless belt, a cooperating lower endless belt, and platens adjacent each of said endless belts to exert substantial pressure on said layers to flatten them as they pass between the belts and platens, said supporting members comprising a forward roller and a rear roller for each endless belt, said belts being treated with polytetrafluoroethylene, said platens being heated and at least one platen being formed in sections, means for applying pressure, and means for gradually changing temperature, a temperature in the first platen section being in the range from about 450–500° F., the temperature in a second platen section is in the range from about 375–400° F., while a temperature in the last platen section is in the range from about 300–350° F.

3. An apparatus as set forth in claim 2 wherein a table precedes the forward rollers, and feeds the decorative surface member of wood veneer in the range from .008–.036'' thick, and a roll of adhesively treated backing in the range of .002–.020'' in a position adjacent the wood veneer at the forward end where the two endless belts meet so that a laminate may be formed by the apparatus, each of said endless belts being fiber glass impregnated with Teflon.

4. An apparatus as set forth in claim 3 wherein a second roll containing a heat softened transparent plastic is placed adjacent said forward end of said apparatus wherein the plastic will become a part of the laminate.

5. An apparatus for smoothing out and bonding a thin laminate which comprises at least one decorative surface layer to a backing layer, comprising supporting members, an upper endless belt, a cooperating lower endless belt, and platens adjacent each of said endless belts to exert substantial pressure on said layers to flatten them as they pass between the belts and platens, said supporting members comprising a forward roller and a rear roller for each endless belt, said belts being treated with polytetrafluoroethylene, said platens being heated and at least one platen being formed in sections, means for applying pressure, and means for gradually changing temperature, said apparatus having two sets of platen systems, the first set of platen systems comprising a single base platen over which are arranged four sections forming an upper platen, means for applying pressure to each of said platen sections, the second set of platen systems comprising a single base section over which are arranged an upper platen comprising seven individual sections, means to apply pressure to each of said platen sections, a table preceding the forward rollers feeding the decorative surface member of wood veneer in the range from .008–.036'' thick, and a roll of adhesively treated backing in the range of .002–.020'' in a position adjacent the wood veneer at the forward end where the two endless belts meet so that a laminate may be formed by the apparatus; and a second roll containing a heat softening transparent plastic placed adjacent said forward end of said apparatus wherein the plastic will become a part of the laminate.

6. An apparatus for smoothing out and bonding a thin laminate which comprises at least one decorative surface layer to a backing layer, comprising supporting members, an upper endless belt, a cooperating lower endless belt, and platens adjacent each of said endless belts to exert substantial pressure on said layers to flatten them as they pass between the belts and platens, the forward end of the endless belts being spaced a substantial distance apart and gradually narrowing toward the platens to form a nip area and a rubber pad of a thickness in the range of 1/16 to 1/4'' being secured to the face of at least one of said platens.

7. Apparatus as defined by claim 6 wherein a Teflon fiber glass fabric having a thickness in the range of about .003 to .01'' is bonded to the lower surface of said rubber pad.

References Cited

UNITED STATES PATENTS

| | | | |
|---|---|---|---|
| 3,185,604 | 5/1965 | Cameron | 156—311X |
| 1,775,950 | 9/1930 | Stevens | 156—555 |
| 2,800,162 | 7/1957 | Rohdin | 156—583X |
| 3,149,013 | 9/1964 | Browning et al. | 156—583X |
| 3,180,778 | 4/1965 | Rinderspacher et al. | 156—312X |
| 3,385,028 | 5/1968 | Pierce | 156—583X |

BENJAMIN A. BORCHELT, Primary Examiner

J. J. DEVITT, Assistant Examiner

U.S. Cl. X.R.

156—311, 312